(12) United States Patent
Takemoto et al.

(10) Patent No.: US 6,827,433 B2
(45) Date of Patent: Dec. 7, 2004

(54) INK COMPOSITION CONTAINING POLYETHER-MODIFIED POLYSILOXANE

(75) Inventors: Kiyohiko Takemoto, Nagano-Ken (JP); Masaaki Itano, Nagano-Ken (JP); Hiroaki Segawa, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 10/079,822

(22) Filed: Feb. 20, 2002

(65) Prior Publication Data

US 2002/0157569 A1 Oct. 31, 2002

(30) Foreign Application Priority Data

| Feb. 21, 2001 | (JP) | ........................ 2001-045166 |
| Mar. 8, 2001 | (JP) | ........................ 2001-065521 |
| Dec. 28, 2001 | (JP) | ........................ 2001-399949 |
| Feb. 15, 2002 | (JP) | ........................ 2002-038907 |

(51) Int. Cl.⁷ .................. C09D 11/02; G01D 11/00
(52) U.S. Cl. .................. 347/100; 106/31.86; 106/31.58
(58) Field of Search .................. 106/31.58, 31.86, 106/31.89; 347/100

(56) References Cited

U.S. PATENT DOCUMENTS

| 4,589,920 A | | 5/1986 | Kanada |
| 5,743,945 A | * | 4/1998 | Yamashita et al. ........ 106/31.58 |
| 5,981,623 A | | 11/1999 | McCain |
| 5,990,201 A | * | 11/1999 | Miyazaki et al. ............ 523/161 |
| 6,261,347 B1 | * | 7/2001 | Moreland ................ 106/31.02 |
| 6,309,452 B1 | * | 10/2001 | Beach et al. ............. 106/31.27 |
| 6,599,353 B2 | * | 7/2003 | Spencer et al. ............ 106/31.6 |
| 2002/0077384 A1 | * | 6/2002 | Sano et al. ................. 523/160 |
| 2003/0189626 A1 | * | 10/2003 | Kataoka et al. ............... 347/98 |

FOREIGN PATENT DOCUMENTS

| EP | 0974626 | | 1/2000 | |
| EP | 1153992 | | 11/2001 | |
| JP | 55-104371 | * | 8/1980 | |
| JP | 59(1984)-66470 | | 4/1984 | ........... C09D/11/02 |
| JP | 60(1985)-173068 | | 9/1985 | ........... C09D/11/02 |
| JP | 64-11174 | * | 1/1989 | |
| JP | 05(1993)-169790 | | 7/1993 | ........... B41M/5/00 |
| JP | 10-158564 | * | 6/1998 | |
| JP | 10(1998)-279871 | | 10/1998 | ........... C09D/11/00 |
| JP | 10(1998)-310732 | | 11/1998 | ........... C09D/11/02 |
| JP | 2002-30237 | * | 1/2002 | |

OTHER PUBLICATIONS

English Machine Translation of JP 2002–030237, Jan. 2002.*
English Machine Translation of JP 10–158564, Jun. 1998.*
English abstract of 64–11174, Jan. 1989.*
English abstract of 55–104371, Aug. 1980.*
JPO Abstract 60(1985)–173068, Sep. 6, 1985.
Computer prepared English translation of JP 05–169790 dated Jul. 9, 1993 from JPO website.
Computer prepared English translation of JP 10–310732 dated Nov. 24, 1998 from JPO website.

* cited by examiner

*Primary Examiner*—Mark L. Bell
*Assistant Examiner*—Veronica F. Faison
(74) *Attorney, Agent, or Firm*—Ladas & Parry

(57) ABSTRACT

An ink composition is provided which can realize good images on plain paper, and, especially when used in an ink jet recording method, can have excellent ejection stability, storage stability, color development, and fixation and is much less likely to cause color bleeding and uneven printing and thus can realize good image quality. The ink composition comprises at least a pigment, a compound represented by formula (I), water, and a water-soluble organic solvent

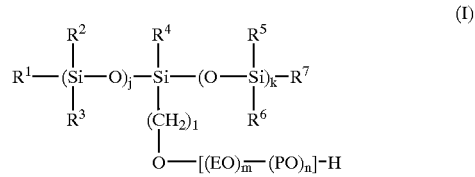

wherein $R^1$ to $R^7$ each independently represent an alkyl group; j and k are an integer of 1 or more; EO represents an ethyleneoxy group; PO represents a propyleneoxy group; and m+n is an integer of 1 or more.

16 Claims, No Drawings

INK COMPOSITION CONTAINING POLYETHER-MODIFIED POLYSILOXANE

BACKGROUND OF THE INVENTION

1. Field of the Invention

The present invention relates to a pigment-based ink composition containing a polyether-modified polysiloxane, which ink composition can realize good image on plain paper.

2. Background Art

Ink jet recording is a recording method wherein ink is ejected as droplets from fine nozzles to record letters or figures onto the surface of recording media. Various properties are required of inks used in ink jet recording. Examples of properties required of such inks include good dispersion stability, ejection stability, and rubbing/scratch resistance of prints.

Inks comprising various water-soluble dyes dissolved in aqueous media have been generally used. Inks comprising pigments dispersed in aqueous media have also been provided. This pigment-based ink is advantageously superior in waterfastness and lightfastness to a dye-based ink.

Dyes penetrate recording media, such as paper, and are fixed thereto. On the other hand, pigment particles do not basically penetrate recording media, such as paper, and stay thereon and develop color. Therefore, pigment-based ink compositions are likely to be influenced by the surface state of the recording media. The so-called "plain paper" causes uneven fixation of pigments due to fuzz of paper fibers and is less likely to realize images having good quality. For this reason, recording media having a smooth and homogeneous surface, that is, the so-called "specialty paper," are provided, and pigment-based ink compositions are printed on the specialty paper to realize high-quality images.

However, there is still a demand for the realization of high-quality images using pigment-based ink compositions on plain paper which is inexpensive and is widely spread.

On the other hand, modified polysiloxane compounds are known as one of silicone surfactants. Several ink compositions containing this compound are also known. For example, Japanese Patent Laid-Open No. 66470/1984 discloses a lithography ink composition containing an organo-modified polysiloxane. Japanese Patent Laid-Open No. 173068/1985 discloses an ink composition comprising a modified polysiloxane as an antifoaming agent. Japanese Patent Laid-Open Nos. 169790/1993 and 310732/1998 disclose ink compositions for ink jet recording, containing a modified polysiloxane having a specific structure. Further, Japanese Patent Laid-Open No. 279871/1998 discloses a dye-based ink composition comprising a polyether-modified polysiloxane.

SUMMARY OF THE INVENTION

The present inventors have now found that an ink composition comprising a polyether-modified polysiloxane having a specific structure can realize good images on plain paper.

Accordingly, it is an object of the present invention to provide an ink composition which can realize good images on plain paper, and, especially when used in an ink jet recording method, can have excellent ejection stability, storage stability, color development, and fixation and is much less likely to cause color bleeding and uneven printing and thus can realize good image quality.

According to one aspect of the present invention, there is provided an ink composition comprising at least a pigment, a compound represented by formula (I), water, and a water-soluble organic solvent:

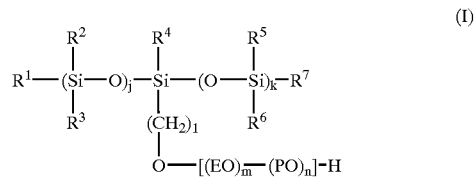

wherein
$R^1$ to $R^7$ each independently represent a $C_{1-6}$ alkyl group,
j and k are each independently an integer of 1 or more,
EO represents an ethyleneoxy group,
PO represents a propyleneoxy group,
m and n are an integer of 0 (zero) or more, provided that m+n is an integer of 1 or more, and
EO and PO may be arranged, regardless of order in the parentheses [ ], randomly or as blocks joined together.

DETAILED DESCRIPTION OF THE INVENTION

Ink Composition

The ink composition according to the present invention may be used in recording methods using an ink composition. Recording methods using an ink composition include, for example, an ink jet recording method, a recording method using writing utensils, such as pens, and other various recording methods. In particular, the ink composition according to the present invention is preferably used in an ink jet recording method.

The ink composition according to the present invention can effectively prevent uneven printing which has been often experienced in printing of pigment-based ink compositions on plain paper and appears to be attributable, for example, to fuzz of paper surface and sizing agents. Further, the ink composition according to the present invention, when used in ink jet recording, can advantageously realize images having good quality which have excellent ejection stability, storage stability, color development, and fixation and are much less likely to cause color bleeding.

Compound Represented by Formula (I)

The ink composition according to the present invention comprises a compound represented by formula (I).

In formula (I), $R^1$ to $R^7$ each independently represent a $C_{1-6}$ alkyl group, preferably a methyl group. j and k are each independently an integer of 1 or more, preferably 1 to 5, more preferably 1 to 4, most preferably 1 or 2. m and n are an integer of 0 (zero) or more, preferably 1 to 5, provided that m+n is an integer of 1 or more, preferably 2 to 4.

According to a preferred embodiment of the present invention, the compound represented by formula (I) satisfies j=k=1 to 3, more preferably 1 or 2. According to another preferred embodiment of the present invention, in the compound represented by formula (I), all of $R^1$ to $R^7$ represent a methyl group, j is 1, k is 1, l is 1, and m is an integer of 1 or more, more preferably 1 to 5, and n is 0 (zero).

The amount of the compound represented by formula (I) added may be properly determined. The amount of this compound added, however, is preferably 0.03 to 3% by weight, more preferably about 0.1 to 2% by weight, still more preferably about 0.3 to 1% by weight.

The compound represented by formula (I) is commercially available, and the commercially available product thereof can be utilized. For example, silicone surfactants BYK 347 and BYK 348 manufactured by Bik-Chemie Japan K.K. can be utilized.

Pigment

The ink composition according to the present invention comprises a pigment as a colorant. Any of inorganic and organic pigments may be used. Inorganic pigments include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

Specific examples of pigments usable herein will be described. Carbon blacks for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Mogul 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4 A, and Special Black 4.

Examples of pigments for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Examples of pigments for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57 : 1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19.

Examples of pigments for cyan inks include C.I. Pigment Blue 1, C.I. Pigment Blue 2, C.I. Pigment Blue 3, C.I. Pigment Blue 15 : 3, C.I. Pigment Blue 15 : 4, C.I. Pigment Blue 15 : 34, C.I. Pigment Blue 16, C.I. Pigment Blue 22, and C.I. Pigment Blue 60.

The pigment is preferably selected from the group consisting of C.I. Pigment Yellow 74, C.I. Pigment Yellow 110, C.I. Pigment Yellow 128, C.I. Pigment Red 122, C.I. Pigment Red 202, C.I. Pigment Red 209, C.I. Pigment Violet 19, C.I. Pigment Blue 15 : 3, and C.I. Pigment Blue 15 : 4. A combination of these pigments can realize ink compositions possessing excellent color reproduction. According to a preferred embodiment of the present invention, the average particle diameter of the pigment is in the range of 10 to 200 nm, more preferably about 50 to 150 nm.

The amount of the pigment added may be properly determined. The amount of the pigment added, however, is preferably in the range of 0.1 to 20% by weight, more preferably in the range of 1 to 10% by weight, based on the ink composition.

In the present invention, preferably, the pigment is added, to the ink composition, as a pigment dispersion prepared by dispersing the pigment with the aid of a dispersant. Dispersants usable herein include polymeric dispersants and surfactants.

Examples of Preferred polymeric dispersants include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxyethylcellulose.

Examples of additional preferred polymeric dispersants include synthetic polymers, and examples thereof include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic acid resins, such as styrene/acrylic acid copolymer, styrene/methacrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a polymer having carboxyl groups (for example, styrene/acrylic acid resin, styrene/maleic acid, styrene/maleic anhydride, vinylnaphthalene/acrylic acid copolymer, vinylnaphthalene/maleic acid copolymer, and vinyl acetate/acrylic acid copolymer) (preferably in the form of a salt), a copolymer of a monomer having a hydrophobic group with a monomer having a hydrophilic group and a polymer of a monomer having both a hydrophobic group and a hydrophilic group are particularly preferred. Examples of the above-described salts include salts with diethylamine, ammonia, ethylamine, triethylamine, propylamine, isopropylamine, dipropylamine, butylamine, isobutylamine, triethanolamine, diethanolamine, aminomethylpropanol, morpholine and the like. The weight average molecular weight of these copolymers is preferably 3,000 to 30,000, more preferably 5,000 to 15,000.

Examples of surfactants, which are preferred as dispersants, include: anionic surfactants, such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants, such as fatty acid amine salts, quaternary ammonium salts, sulfonium salts, and phosphoniums; and nonionic surfactants, such as polyoxyethylene alkyl ethers, polyoxyethylene alkyl esters, sorbitan alkyl esters, and polyoxyethylene sorbitan alkyl esters. A person having ordinary skill in the art would appreciate that these surfactants, when added to the ink composition, function also as a surfactant.

Water, Water-Soluble Organic Solvent, and other Optional Ingredients

In the ink composition according to the present invention, water may be pure water obtained by ion exchange, ultrafiltration, reverse osmosis, distillation or the like, or ultrapure water. Further, water, which has been sterilized, for example, by ultraviolet irradiation or by addition of hydrogen peroxide, is suitable because, when the ink composition is stored for a long period of time, it can prevent the growth of mold or bacteria.

The water-soluble organic solvent is preferably a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol.

Particularly preferred are monohydric alcohols. The low-boiling organic solvent has the effect of shortening the time required for drying ink. The amount of the low-boiling organic solvent added is preferably not more than about 5% by weight, more preferably not more than about 2% by weight, based on the ink composition.

According to a preferred embodiment of the present invention, the ink composition further contains a wetting agent comprising a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; urea; 2-pyrrolidone and N-methyl-2-pyrrolidone; and 1,3-dimethyl-2-imidazolidinone. They may be used alone or as a mixture of two or more. Among them, glycerin, triethylene glycol monobutyl ether, 2-pyrrolidone, ethylene glycol, diethylene glycol, triethylene glycol, polyethylene glycol, diethylene glycol monobutyl ether, and urea are preferred. The amount of the wetting agent added is preferably in the range of about 1 to 20% by weight, more preferably in the range of about 5 to 10% by weight, based on the ink composition.

According to a preferred embodiment of the present invention, the ink composition further comprises a 1,2-alkanediol or dipropylene glycol monomethyl ether. The 1,2-alkanediol is preferably a 1,2-$C_{1-6}$ alkanediol, most preferably 1,2-hexanediol. The amount of the 1,2-alkanediol added may be properly determined. The amount of the 1,2-alkanediol added, however, is preferably about 1 to 15% by weight, more preferably about 2 to 10% by weight.

According to a preferred embodiment of the present invention, the ink composition comprises a penetrating agent. Specific examples of preferred penetrating agents include glycol ethers and acetylene glycol surfactants.

Specific examples of glycol ethers usable in the present invention include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monoethyl ether, dipropylene glycol mono-n-propyl ether, dipropylene glycol mono-iso-propyl ether. They may be used alone or as a mixture of two or more. The amount of glycol ethers added is preferably in the range of 1 to 20% by weight, more preferably in the range of 2 to 15% by weight, based on the ink composition.

According to a preferred embodiment of the present invention, the use of the alkyl ether of the polyhydric alcohol is preferred. In particular, the use of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, or triethylene glycol monobutyl ether is preferred. Triethylene glycol monobutyl ether is most preferred. The amount of the alkyl ether of the polyhydric alcohol added may be properly determined. The amount of the alkyl ether of the polyhydric alcohol added, however, is preferably about 1 to 10% by weight, more preferably about 3 to 5% by weight.

Specific examples of preferred acetylene glycol surfactants usable in the present invention include compounds represented by formula (II)

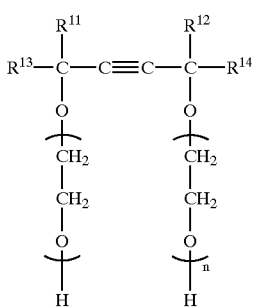

(II)

wherein m+n is 0 (zero) to 50; and $R^{11}$, $R^{12}$, $R^{13}$, and $R^{14}$ each independently represent an alkyl group, preferably an alkyl group having 1 to 6 carbon atoms.

Among the compounds represented by formula (II), particularly preferred compounds include, for example, 2,4,7,9-tetramethyl-5-decyne-4,7-diol, 3,6-dimethyl-4-octyne-3,6-diol, and 3,5-dimethyl-1-hexyn-3-ol. Commercially available products may also be used as the compound represented by the formula (II). Specific examples thereof include: Surfynol 104, Surfynol 82, Surfynol 465, Surfynol 485, and Surfynol TG (all the above products being available from Air Products and Chemicals Inc.); and Olfine STG and Olfine E 1010 (both the products being available from Nissin Chemical Industry Co., Ltd.).

The amount of the acetylene glycol surfactant added may be properly determined. The amount of the acetylene glycol surfactant added, however, is preferably in the range of about 0.1 to 10% by weight, more preferably in the range of about 0.1 to 2% by weight, based on the ink composition.

According to a preferred embodiment of the present invention, the ink composition may further comprise a saccharide. Specific examples of preferred saccharides include: monosaccharides; disaccharides; oligosaccharides including trisaccharides and tetrasaccharides; and other polysaccharides, preferably glucose, mannose, fructose, ribose, xylose, arabinose, galactose, aldonic acid, glucitol, sorbitol, maltose, cellobiose, lactose, sucrose, trehalose, maltotriose, and xylitol. The term "polysaccharide" used herein means saccharides in the broad sense as including substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_n CH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is preferably about 1 to 20% by weight, more preferably about 3 to 10% by weight, based on the ink composition.

The ink composition according to the present invention may further contain a surfactant. Examples of surfactants usable herein include: anionic surfactants, for example, sodium dodecylbenzenesulfonate, sodium laurylate, and ammonium salt of polyoxyethylene alkyl ether sulfates; and nonionic surfactants, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides. They may be used alone or in a combination of two or more.

If necessary, other additives, for example, nozzle clogging preventives, preservatives and antimolds, antioxidants, electric conductivity adjustors, pH adjustors, viscosity modifiers, surface tension modifiers, and oxygen absorbers, may be added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives and antimolds.

Examples of pH adjustors, solubilizers, or antioxidants usable herein include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

The ink composition according to the present invention may contain an additional antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622, and Tinuvin 770; Irgacor 252 and Irgacor 153; Irganox 1010, Irganox 1076, and Irganox 1035; MD 1024; and lanthanide oxides.

EXAMPLES

The present invention will be described in more detail with reference to the following examples, though it is not limited to these examples only. Numerical values in tables below are in % by weight.

Example A

Preparation of Ink Compositions (1) Preparation of Pigment Dispersions

A pigment, a styrene-acrylic acid copolymer resin (acid value 100, average molecular weight 10000), potassium hydroxide, and water were mixed together, and the mixture was dispersed in a sand mill (manufactured by Yasukawa Seisakusho) with the aid of zirconia beads. Thereafter, the beads were removed, followed by centrifugation and filtration through a filter to remove coarse particles. Thus, pigment dispersions were prepared.

According to pigments used, pigment dispersions were designated as follows.

Pigment dispersion BK: Carbon black (Carbon black S 170, manufactured by Degussa)

Pigment dispersion Y1: C.I. Pigment Yellow 74

Pigment dispersion Y2: C.I. Pigment Yellow 128

Pigment dispersion M: C.I. Pigment Red 122
Pigment dispersion C: C.I. Pigment Blue 15:3

(2) Preparation of Ink Composition

The above pigment dispersions were mixed with ingredients indicated in the following tables, and the mixtures were stirred at 25° C. for 60 min. The mixed liquids were filtered through a 5-µm membrane filter to prepare ink compositions.

In the following tables, silicone surfactant BYK 347 is a silicone surfactant manufactured by Bik-Chemie Japan K.K. and is a compound represented by formula (I) wherein all of $R^1$ to $R^7$ represent a methyl group, j is 1, k is 1, m is 1, and n is 0 (zero), and Olfine E 1010 is an acetylene glycol surfactant manufactured by Nissin Chemical Industry Co., Ltd.

TABLE 1

| Example | A1 | A2 | A3 | A4 | A5 | A6 | A7 | A8 |
|---|---|---|---|---|---|---|---|---|
| Pigment dispersion | 6* (Bk) | 4* (Y1) | 5* (M) | 4* (C) | 6* (Bk) | 6* (Y2) | 7* (M) | 5* (C) |
| Silicone surfactant BYK 347 | 0.3 | 1 | 1 | 1 | 0.05 | 2 | 1 | 0.1 |
| 1,2-Hexanediol | 2 | 5 | 5 | 5 | 1 | 15 | 10 | 1 |
| Glycerin | 10 | 10 | 10 | 10 | 10 | 10 | 10 | 10 |
| 2-Pyrrolidone | — | — | — | — | — | — | — | — |
| Triethanolamine | 1 | 1 | 1 | 1 | 1 | 1 | 1 | 1 |
| Pure water | Balance | Balance | Balance | Balance | Balance | Balance | Balance | Balance |

*Numerical value represents solid content of pigment, and character within parentheses represents the type of pigment dispersion.

TABLE 2

| Example | A9 | A10 | A11 | A12 |
|---|---|---|---|---|
| Pigment dispersion | 7* (Bk) | 6* (Y1) | 7* (M) | 5* (C) |
| Silicone surfactant BYK 347 | 0.3 | 1 | 0.5 | 0.5 |
| 1,2-Hexanediol | 3 | 5 | 5 | 5 |
| Glycerin | 10 | 10 | 10 | 10 |
| Triethylene glycol monobutyl ether | — | 3 | 3 | 3 |
| Olfine E 1010 | 0.3 | 0.5 | 0.3 | — |
| Triethanolamine | 1 | 1 | 1 | 1 |
| Pure water | Balance | Balance | Balance | Balance |

*Numerical value represents solid content of pigment, and character within parentheses represents the type of pigment dispersion.

Evaluation Tests

An ink jet printer EM 900° C. manufactured by Seiko Epson Corp. was loaded with the above ink composition, and printing was carried out by means of this ink jet printer at an amount of ink ejected of 0.04 µg/dot.

Evaluation 1: Uneven Printing

An image comprising a 100% duty print portion and a character print portion was printed at a resolution of 720 dpi by each color ink composition on Xerox 4042 (Xerox Corp.), Xerox P (Xerox Corp.), and Hanmer Mill Copy Plus (Hanmer Mill). The OD value of the prints was measured for randomly selected 10 points with an OD measuring device (SPM-50, manufactured by GRETAG). The results were evaluated according to the following criteria.

AA: A difference in OD value among 10 points of less than 0.02

A: A difference in OD value among 10 points of 0.02 to less than 0.05

B: A difference in OD value among 10 points of 0.05 to less than 0.1

C: A difference in OD value among 10 points of 0.1 to less than 0.15

D: A difference in OD value among 10 points of not less than 0.15

Evaluation 2: Feathering

The character print portions obtained in evaluation 1 were visually inspected for feathering and were evaluated according to the following criteria.

A: All the papers were free from feathering.

B: For only at least one type of paper, feathering slightly occurred.

C: For all the papers, feathering occurred.

D: For at least one type of paper, feathering occurred on a level such that the outline of characters was unclear.

Evaluation 3: Bleeding

Printing was carried out using the same recording papers and printing conditions as used in evaluation 1, except that single colors (black, cyan, magenta, and yellow) and secondary colors (red, green, and blue) were printed so as to adjoin each other, and the prints were visually inspected for uneven color mixing in boundaries of adjacent colors (bleeding). The results were evaluated according to the following criteria.

AA: For all the papers, no color mixing occurred between single colors and between secondary colors, and the boundaries between adjacent colors were clear.

A: For all the papers, no color mixing occurred between single colors at all and the boundaries between adjacent colors were clear, although color mixing slightly occurred between secondary colors for at least one type of paper.

B: For only one type of paper, color mixing slightly occurred between single colors and between secondary colors.

C: For all the papers, feather-like color mixing occurred.

D: For at least one type of paper, significant color mixing occurred to such an extent that the boundaries between adjacent colors were unclear.

Evaluation 4: Ejection Stability

Continuous printing was carried out at room temperature, and the prints were inspected for dropouts of dots and scattering of ink. The results were evaluated according to the following criteria.

AA: The number of times of the occurrence of dropouts of dots or scattering of ink was not more than 10 times after the elapse of 72 hr from the start of the printing.

A: 10 times in total of dropouts of dots or scattering of ink occurred in a period between the elapse of 48 hr from the start of the printing and the elapse of 72 hr from the start of the printing.

B: 10 times in total of dropouts of dots or scattering of ink occurred in a period between the elapse of 24 hr from the start of the printing and the elapse of 48 hr from the start of the printing.

C: 10 times in total of dropouts of dots or scattering of ink occurred in a period between the elapse of 1 hr from the start of the printing and the elapse of 24 hr from the start of the printing.

D: 10 times in total of dropouts of dots or scattering of ink occurred within 1 hr from the start of the printing.

Evaluation 5: Anti-Clogging Property

The printer was loaded with ink, and it was confirmed that printing could be normally carried out. Thereafter, the printer was stopped and was then allowed to stand under an environment of room temperature (25° C.) for 6 months. After the standing, printing was resumed to determine the number of cleaning operations necessary for print quality equal to that before the standing to be obtained without a failure of ejection. The results were evaluated according to the following criteria.

A: Print quality equal to the initial print quality could be obtained after 0 to 5 cleaning operations.

B: Print quality equal to the initial print quality could be obtained after 6 to 10 cleaning operations.

C: Even after 11 cleaning operations, print quality equal to the initial print quality could not be obtained.

Evaluation 6: Storage Stability of Ink

An ink composition (50 cc) was placed in a closed vessel and was allowed to stand under an environment of 60° C. for 2 months. A difference in viscosity between the ink composition before standing and the ink composition after standing was evaluated according to the following criteria.

A: A difference in viscosity of less than 10%

B: A difference in viscosity of not less than 10%

The results were as summarized in the following tables.

TABLE 3

| Example | A1 | A2 | A3 | A4 | A5 | A6 | A7 | A8 | A9 | A10 | A11 | A12 |
|---|---|---|---|---|---|---|---|---|---|---|---|---|
| Evaluation 1 | AA | AA | AA | AA | B | AA | AA | A | AA | AA | AA | AA |
| Evaluation 2 | A | A | A | A | B | A | A | B | A | A | A | A |
| Evaluation 3 | | | AA | | | | A | | | AA | | |
| Evaluation 4 | AA | AA | AA | AA | AA | A | AA | AA | AA | AA | AA | AA |
| Evaluation 5 | A | A | A | A | A | A | A | A | A | A | A | A |
| Evaluation 6 | A | A | A | A | A | A | A | A | A | A | A | A |

Example B

The procedure of Example A was repeated, except that BYK 348 (a silicone surfactant composed mainly of a compound represented by formula (I) wherein j=1, k=2, l=1, m>1, and n=0; manufactured by Bik-Chemie Japan K.K.) was used instead of the silicone surfactant BYK 347. Thus, ink compositions of Examples B1 to B12 were prepared. Formulations of the ink compositions of Examples B1 to B12 were as summarized in the following tables.

TABLE 4

| Example | B1 | B2 | B3 | B4 | B5 | B6 | B7 | B8 |
|---|---|---|---|---|---|---|---|---|
| Pigment dispersion | 6* (Bk) | 4* (Y1) | 5* (M) | 4* (C) | 6* (Bk) | 6* (Y2) | 7* (M) | 5* (C) |
| Silicone surfactant BYK 348 | 0.3 | 1 | 1 | 1 | 0.05 | 2 | 1 | 0.1 |
| 1,2-Hexanediol | 2 | 5 | 5 | 5 | 1 | 15 | 10 | 1 |
| Glycerin | 10 | 10 | 10 | 10 | 10 | 10 | 10 | 10 |
| 2-Pyrrolidone | — | — | — | — | — | — | — | — |
| Triethanolamine | 1 | 1 | 1 | 1 | 1 | 1 | 1 | 1 |
| Pure water | Balance | Balance | Balance | Balance | Balance | Balance | Balance | Balance |

*: Numerical value represents solid content of pigment, and character within parentheses represents the type of pigment dispersion.

TABLE 5

| Example | B9 | B10 | B11 | B12 |
|---|---|---|---|---|
| Pigment dispersion | 7* (Bk) | 6* (Y1) | 7* (M) | 5* (C) |
| Silicone surfactant BYK 348 | 0.3 | 1 | 0.5 | 0.5 |
| 1,2-Hexanediol | 3 | 5 | 5 | 5 |
| Glycerin | 10 | 10 | 10 | 10 |
| Triethylene glycol monobutyl ether | — | 3 | 3 | 3 |
| Olfine E 1010 | 0.3 | 0.5 | 0.3 | — |
| Triethanolamine | 1 | 1 | 1 | 1 |
| Pure water | Balance | Balance | Balance | Balance |

*Numerical value represents solid content of pigment, and character within parentheses represents the type of pigment dispersion.

The above ink compositions were evaluated in the same manner as in Example A. The results were as summarized in the following table.

TABLE 6

| Example | B1 | B2 | B3 | B4 | B5 | B6 | B7 | B8 | B9 | B10 | B11 | B12 |
|---|---|---|---|---|---|---|---|---|---|---|---|---|
| Evaluation 1 | A | A | A | A | C | A | A | B | A | A | A | A |
| Evaluation 2 | A | A | A | A | B | A | A | B | A | A | A | A |
| Evaluation 3 |   | A |   |   | B |   |   |   | A |   |   |   |
| Evaluation 4 | A | A | A | A | A | A | A | A | A | A | A | A |
| Evaluation 5 | A | A | A | A | A | A | A | A | A | A | A | A |
| Evaluation 6 | A | A | A | A | A | A | A | A | A | A | A | A |

Example C

The procedure of Example A was repeated, except that a compound α represented by formula (I), wherein j=1, k=3, l=1, m=5, and n=0, was used instead of the silicone surfactant BYK 347 and a part of the chemical composition was changed. Thus, ink compositions of Examples C1 to C4 were prepared. Formulations of the ink compositions of Examples C1 to C4 were as summarized in the following table.

TABLE 7

| Example | C1 | C2 | C3 | C4 |
|---|---|---|---|---|
| Pigment dispersion | 6* (Bk) | 5* (Y1) | 6* (M) | 4* (C) |
| Silicone surfactant compound α | 1 | 1 | 2 | 3 |
| 1,2-Hexanediol | 5 | 5 | 5 | 5 |
| Glycerin | 14 | 12 | 10 | 10 |
| 2-Pyrrolidone | 2 | 2 | 2 | 2 |
| Triethanolamine | 1 | 1 | 1 | 1 |
| Pure water | Balance | Balance | Balance | Balance |

*Numerical value represents solid content of pigment, and character within parentheses represents the type of pigment dispersion.

The above ink compositions were evaluated in the same manner as in Example A. The results were as summarized in the following table.

TABLE 8

| Example | C1 | C2 | C3 | C4 |
|---|---|---|---|---|
| Evaluation 1 | A | A | A | A |
| Evaluation 2 | A | A | A | A |
| Evaluation 3 |   |   | A |   |

TABLE 8-continued

| Example | C1 | C2 | C3 | C4 |
|---|---|---|---|---|
| Evaluation 4 | A | A | A | A |
| Evaluation 5 | A | A | A | A |
| Evaluation 6 | A | A | A | A |

Example D

The procedure of Example A was repeated, except that a compound β represented by formula (I), wherein j=2, k=2, l=1, m=5, and n=0, was used instead of the silicone surfactant BYK 347 and a part of the chemical composition was changed. Thus, ink compositions of Examples D1 to D4 were prepared. Formulations of the ink compositions of Examples D1 to D4 were as summarized in the following table.

TABLE 9

| Example | D1 | D2 | D3 | D4 |
|---|---|---|---|---|
| Pigment dispersion | 6* (Bk) | 4* (Y1) | 5* (M) | 4* (C) |
| Silicone surfactant compound β | 1 | 1 | 2 | 3 |
| 1,2-Hexanediol | 5 | 5 | 5 | 5 |
| Glycerin | 14 | 12 | 10 | 10 |
| 2-Pyrrolidone | — | — | — | — |
| Triethanolamine | 1 | 1 | 1 | 1 |
| Pure water | Balance | Balance | Balance | Balance |

*Numerical value represents solid content of pigment, and character within parentheses represents the type of pigment dispersion.

The above ink compositions were evaluated in the same manner as in Example A. The results were as summarized in the following table.

TABLE 10

| Example | D1 | D2 | D3 | D4 |
|---|---|---|---|---|
| Evaluation 1 | AA | AA | AA | AA |
| Evaluation 2 | A | A | A | A |
| Evaluation 3 |   |   | AA |   |
| Evaluation 4 | AA | AA | AA | AA |
| Evaluation 5 | A | A | A | A |
| Evaluation 6 | A | A | A | A |

Example E

The procedure of Examples A9 to A12 is repeated, except that dipropylene glycol monomethyl ether is used instead of 1,2-hexanediol. Thus, ink compositions of Examples E1 to E4 are prepared.

The ink compositions are evaluated in the same manner as in Example A. The results are expected to be as summarized in the following table.

TABLE 11

| Example | E1 | E2 | E3 | E4 |
|---|---|---|---|---|
| Evaluation 1 | AA | AA | AA | AA |
| Evaluation 2 | A | A | A | A |
| Evaluation 3 |   |   | AA |   |
| Evaluation 4 | AA | AA | AA | AA |
| Evaluation 5 | A | A | A | A |
| Evaluation 6 | A | A | A | A |

What is claimed is:
1. An ink jet recording process comprising the step of ejecting droplets of an ink composition onto a recording medium to form a print thereon, wherein the ink composition comprises a pigment, a compound represented by formula (I), water, and a water-soluble organic solvent:

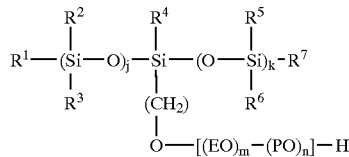
(I)

wherein
- $R^1$ to $R^7$ each independently represents a $C_{1-6}$ alkyl group, j=2 and k=2,
- EO represents an ethyleneoxy group,
- PO represents a propyleneoxy group,
- m and n are an integer of 0 (zero) or more, provided that m+n is an integer of 1 or more, and
- EO and PO may be arranged, regardless of order in the parentheses [ ], randomly or as blocks joined together.

2. The process according to claim 1, wherein all of $R^1$ to $R^7$ in formula (I) represent a methyl group, m is an integer of 1 or more, and n is 0 (zero).

3. The process according to claim 1, wherein the ink composition comprises 0.03 to 3% by weight of the compound represented by formula (I).

4. The process according to claim 1, wherein the pigment has been dispersed in the ink composition with the aid of a polymer having carboxyl groups.

5. The process according claim 4, wherein the polymer having carboxyl groups is a styrene-acrylic acid resin.

6. The process according to claim 1, wherein the ink composition which further comprises an 1,2-alkanediol or dipropylene glycol monomethyl ether.

7. The process according to claim 6, wherein the 1,2-alkanediol is 1,2-hexanediol.

8. The process according to claim 7, wherein the ink composition comprises 1 to 15% by weight of the 1,2-alkanediol.

9. The process according to claim 1, wherein the ink composition further comprises an alkyl ether of a polyhydric alcohol.

10. The process according to claim 9, wherein the alkyl ether of the polyhydric alcohol is ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, or triethylene glycol monobutyl ether.

11. The process according to claim 9, wherein the alkyl ether of the polyhydric alcohol is triethylene glycol monobutyl ether.

12. The process according to claim 1, wherein the ink composition further comprises an acetylene glycol surfactant.

13. The process according to claim 12, wherein the acetylene glycol surfactant is represented by formula

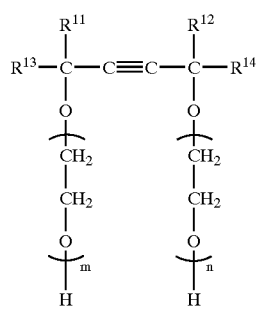
(II)

wherein m+n is 0 (zero) to 50; and $R^{11}R^{12}$, $R^{13}$, and $R^{14}$ each independently represent an alkyl group.

14. The process according to claim 1, wherein the pigment is selected from the group consisting of C.I. Pigment Yellow 74, C.I. Pigment Yellow 110, C.I. Pigment Yellow 128, C.I. Pigment Red 122, CI. Pigment Red 202, C.I. Pigment Red 209, C.I. Pigment Violet 19, CI. Pigment Blue 15:3, and C.I. Pigment 15:4.

15. The process of claim 1, wherein the pigment, compound represented by formula (I), water and water-soluble organic solvent are present in the ink composition in respective amounts such that the print formed on the recording medium by the process is free from feathering.

16. The process of claim 1, wherein the compound represented by formula (I) is present in the ink composition in an amount of about 0.3 to 2% by weight.

* * * * *